(12) United States Patent
Hosoda

(10) Patent No.: US 6,629,155 B1
(45) Date of Patent: Sep. 30, 2003

(54) DATA INPUT/OUTPUT METHOD AND APPARATUS AND STORAGE MEDIUM

(75) Inventor: Osamu Hosoda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 09/587,288

(22) Filed: Jun. 5, 2000

(30) Foreign Application Priority Data

Jun. 8, 1999 (JP) .......................................... 11-160734

(51) Int. Cl.[7] ................................................ G06F 3/00
(52) U.S. Cl. ................................ 710/5; 710/6; 710/38; 710/52; 358/1.16; 358/1.17
(58) Field of Search .............................. 710/52, 53, 5, 710/6; 358/1.1–3.32

(56) References Cited

U.S. PATENT DOCUMENTS 6,437,875 B1 * 8/2002 Unno ......................... 358/1.16

* cited by examiner

*Primary Examiner*—Jeffrey Gaffin
*Assistant Examiner*—Joshua D Schneider
(74) *Attorney, Agent, or Firm*—Fitzpatrick, Cella, Harper & Scinto (57) ABSTRACT

An object of the invention is to provide a data input/output method and apparatus which can avoid the transfer of unnecessary data in a double-sided output mode and can reduce a time that is required from an input to an output. To accomplish this object, data inputted to a RAM from a data input unit is stored in auxiliary storage, the data stored in auxiliary storage is transferred to the RAM and outputted to a printer engine when it is ready to output the data in the printer engine, and when the CPU determines that the inputted data is data to be outputted to the reverse side of a print medium, already having printed thereon previously outputted data, the CPU controls the system in such a manner that the data inputted to the RAM from the data input unit is directly outputted to the printer engine without storing it in auxiliary storage.

8 Claims, 5 Drawing Sheets

```
┌─────────────────────┐
│  OUTPUT FORM        │──301
│  INFORMATION        │
├─────────────────────┤
│                     │
│                     │──302
│  IMAGE DATA         │
│                     │
│                     │
└─────────────────────┘
```

FIG. 4

| IMAGE ID 401 | STORAGE 402 |
|---|---|
| 0 | PRIMARY |
| 1 | PRIMARY |
| 2 | SECONDARY |
| 3 | PRIMARY |
| 4 | SECONDARY |

DATA INPUT/OUTPUT METHOD AND APPARATUS AND STORAGE MEDIUM

BACKGROUND OF THE INVENTION

1. Field of the Invention

The invention relates to data input/output method and apparatus for outputting image data inputted from, for example, an external input device or the like to an output medium such as a print paper or the like and relates to a storage medium which stores a control program for controlling the input/output apparatus.

2. Related Background Art

Hitherto, as a storage device for temporarily storing image data when the image data is inputted or outputted, there has been known an image data input/output apparatus having the following two kinds of storage devices: namely, a storage device which can store a large amount of data like a plurality of image data; and a storage device which can directly input image data from an image data input unit and directly output the image data to an image data output unit.

As a control method for the above image data input/output apparatus, there has been known a data input/output control method whereby the image data inputted from the image data input unit to the storage device for inputting/outputting is held in a storage device of a large capacity, when it is ready to output the image data in the image data output unit, the image data stored in the storage device of a large capacity is transferred to the storage device for inputting/outputting and outputted to the image data output unit.

In the above control method, there has been known a processing method whereby when a prediction time that is required until the preparation of the image data output in the image data output unit is completed is determined to be shorter than a time that is required for the control process, the image data is not transferred to the storage device of a large capacity but the image data inputted to the storage device for inputting/outputting from the image data input unit is directly outputted to the image data output unit.

According to the above conventional example, the image data inputted to the storage device for inputting/outputting from the image data input unit is temporarily transferred to another storage device and the image data is transferred again to the storage device for inputting/outputting when it is ready to output the image data in the image data output unit. Consequently, even in a situation requiring a high response speed in a print preparation in such a mode as to print and output the image data onto both sides of an output medium, there exists the problem that there is a possibility of performing an unnecessary process of transferring the image data in an output preparing process of the second image data.

SUMMARY OF THE INVENTION

The invention is made in consideration of the foregoing problem in the conventional technique as mentioned above and it is the first object of the invention to provide a data input/output method and apparatus which can avoid a transfer of unnecessary data in a double-sided output mode of an output medium and can reduce a time that is required from an input to an output.

The second object of the invention is to provide a storage medium which stores a control program for controlling the data input/output apparatus of the invention mentioned above.

To accomplish the first object, according to one aspect of the invention, there is provided a data input/output method of inputting/outputting data by a data input/output apparatus having first storage means which can store a large amount of data and second storage means which can directly input data from a data input unit and can directly output the data to a data output unit, comprising: a data storing step of storing the data inputted from the data input unit to the second storage means into the first storage means; a data output step of transferring the data stored in the first storage means to the second storage means and outputting the data to the data output unit when it is ready to output the data in the data output unit; a data discriminating step of discriminating whether the inputted data is data to be outputted to a reverse side of an output medium of the data which was outputted at the previous time or not; and a control step of controlling in such a manner that the data inputted from the data input unit to the second storage means is directly outputted to the data output unit without storing into the first storage means in the case where it is determined in the data discriminating step that the inputted data is the data to be outputted to the reverse side of the output medium of the data which was outputted at the previous time.

To accomplish the second object, according to another aspect of the invention, there is provided a storage medium which stores a control program for controlling a data input/output apparatus having first storage means which can store a large amount of data and second storage means which can directly input data from a data input unit and can directly output the data to a data output unit, wherein the control program comprises: a data storing module for storing the data inputted from the data input unit to the second storage means into the first storage means; a data output module for transferring the data stored in the first storage means to the second storage means and outputting the data to the data output unit when it is ready to output the data in the data output unit; a data discriminating module for discriminating whether the inputted data is data to be outputted to a reverse side of an output medium of the data which was outputted at the previous time or not; and a control module for controlling in such a manner that the data inputted from the data input unit to the second storage means is directly outputted to the data output unit without storing it into the first storage means in the case where it is determined by the data discriminating module that the inputted data is the data to be outputted to the reverse side of the output medium of the data which was outputted at the previous time.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to the drawings.

First Embodiment

The first embodiment of the invention will be first described with reference to FIGS. 1 to 6.

Figure 1:
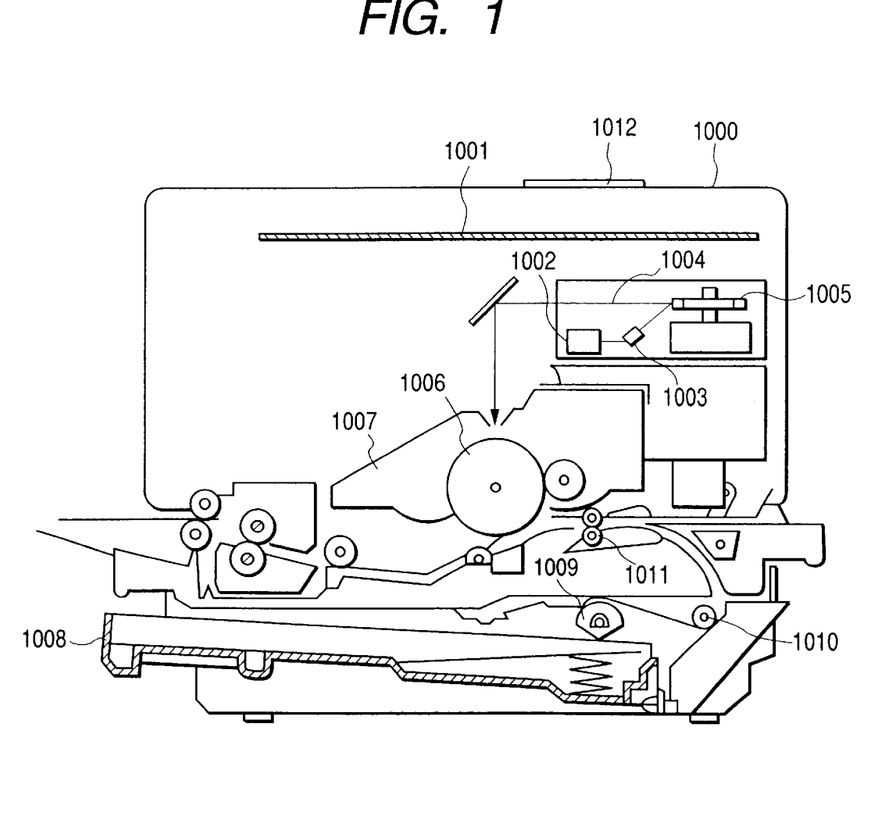
FIG. 1 is a vertical sectional view showing a schematic construction of a data input/output apparatus according to the first embodiment of the invention.

FIG. 1 is a vertical sectional view showing a schematic construction of a laser beam printer (LBP) as a data input/output apparatus according to the embodiment.

The laser beam printer can register a character pattern from a data source (not shown) and register a regular form (form data) or the like.

In FIG. 1, reference numeral 1000 denotes a laser beam printer for inputting and storing character information (character code), form information, macro command, or the like which is supplied from a host computer (information processing apparatus) 3000 (refer to FIG. 2) connected to the outside, generating a corresponding character pattern, form pattern, or the like in accordance with that information, and forming an image onto a recording paper or the like serving as a recording medium (output medium). Reference numeral 1001 denotes a printer control unit for controlling the whole printer 1000 and analyzes the character information or the like which is supplied from the host computer 3000. The printer control unit 1001 converts mainly the character information into a video signal of the corresponding character pattern and outputs it to a laser driver 1002. The laser driver 1002 drives a semiconductor laser 1003 and on/off switches a laser beam 1004 which is emitted from the semiconductor laser 1003 in accordance with the inputted video signal.

The laser beam 1004 is swung to the right and left by a rotary polygon mirror 1005 and scans on an electrostatic drum 1006. Thus, an electrostatic latent image of the character pattern is formed on the electrostatic drum 1006. The electrostatic latent image is developed by a developing unit 1007 arranged around the electrostatic drum 1006 and, thereafter, transferred onto the recording paper. Cut sheet recording papers are used as recording papers. The cut sheet recording papers are enclosed in a sheet cassette 1008 set in the laser beam printer 1000 and picked up and conveyed one by one into the apparatus by a paper feed roller 1009 and conveying rollers 1010 and 1011 and supplied to the electrostatic drum 1006. Reference numeral 1012 denotes an operation panel on which switches (not shown) for operation, an LED (light emitting diode) display (not shown), and the like are arranged.

Figure 2:
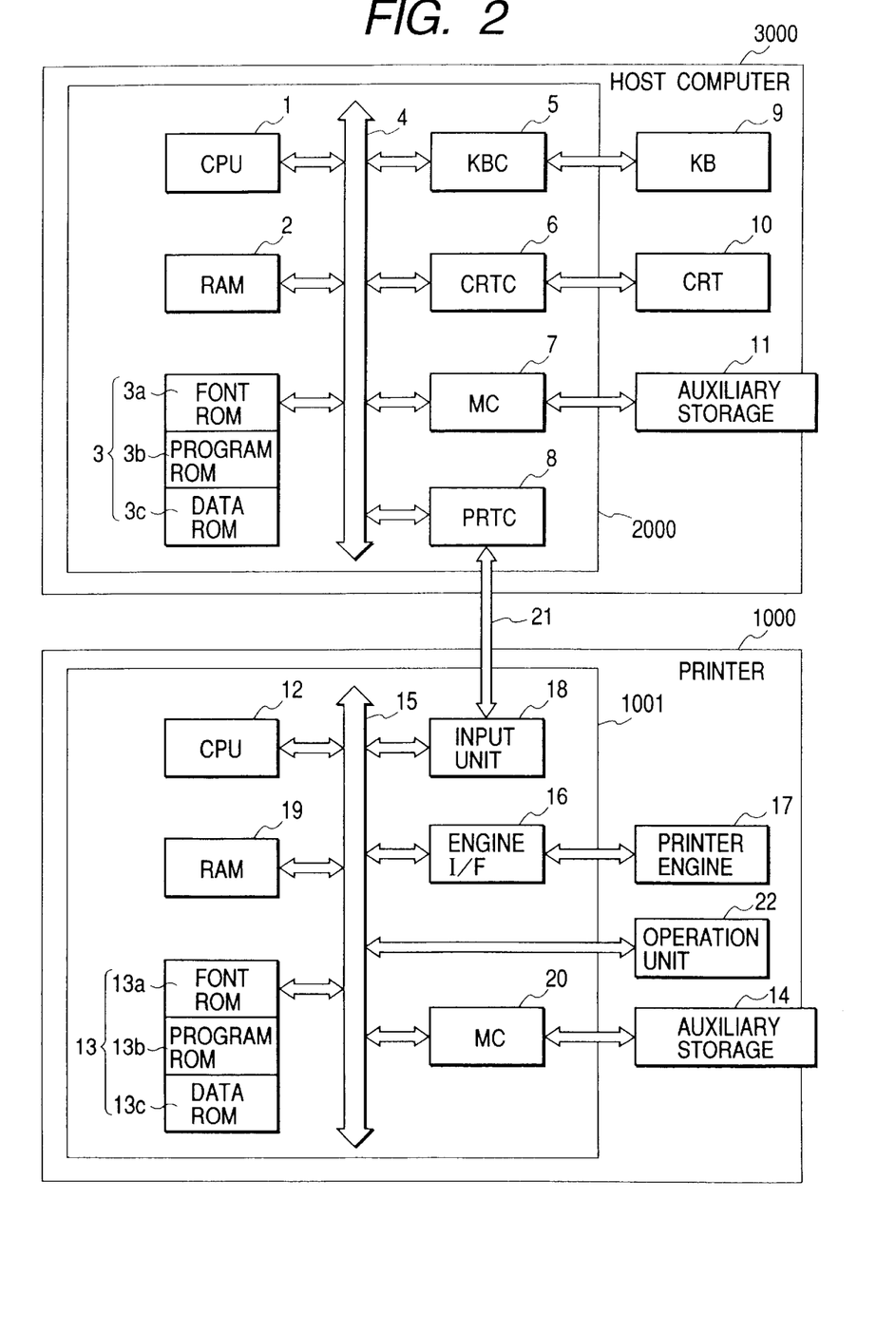
FIG. 2 is a block diagram showing a construction of a data input/output control system having the data input/output apparatus according to the first embodiment of the invention.

FIG. 2 is a block diagram showing a construction of a data input/output control system for controlling the data input/output apparatus according to the embodiment.

A laser beam printer is shown here as an example of the data input/output apparatus and will be explained.

The invention can be applied to any of a system comprising a single apparatus or a plurality of apparatuses and a system in which processes are executed via a network such as a LAN (Local Area Network) or the like so long as the functions of the invention are executed.

The invention can be applied to a case where the functions of the invention are embodied by supplying a program to a system or an apparatus. In this case, a storage medium on which a control program according to the invention has been stored constructs the invention. By reading out the control program from the storage medium and installing it into the system or apparatus, the system or apparatus operates in accordance with a predetermined specification.

In FIG. 2, the same component elements as those in FIG. 1 are designated by the same reference numerals.

In FIG. 2, reference numeral 3000 denotes the host computer (information processing apparatus) and 1000 indicates the laser beam printer (hereinafter, referred to as a printer).

The host computer 3000 comprises: a CPU (central processing unit) 1; a RAM (random access memory) 2; a ROM (read only memory) 3; a system bus 4; a keyboard controller (KBC) 5; a CRT controller (CRTC) 6; a memory controller (MC) 7; a printer controller (PRTC) 8; a keyboard (KB) 9; a CRT display (CRT) 10; and an auxiliary storage 11.

The CPU 1 executes processes of a document in which a figure, an image, characters, a table (including a spreadsheet or the like), and the like mixedly exist on the basis of a document processing program or the like. The RAM 2 functions as a main memory, a work area, or the like of the CPU 1. The ROM 3 has a font ROM 3a, a program ROM 3b, and a data ROM 3c. Font data or the like which is used in the document processes is stored in the font ROM 3a. The control program or the like of the CPU 1 is stored in the program ROM 3b. Various data which is used in the document processes is stored in the data ROM 3c. The respective devices constructing the host computer 3000 are connected to the system bus 4. The CPU 1 integratedly controls the devices connected to the system bus 4. The keyboard controller 5 controls a key input from the keyboard 9 or a pointing device (not shown). The CRT controller 6 controls a display of the CRT display 10. The memory controller 7 controls an access to the auxiliary storage 11 such as hard disk (HD), floppy disk (FD), or the like for storing a boot program, various applications, font data, a user file, an edition file, and the like. The printer controller 8 is connected to the printer 1000 via a predetermined bidirectional interface (hereinafter, referred to as an interface) 21 and executes a communication control process with the printer 1000.

The CPU 1 executes, for example, a developing (rasterizing) process of an outline font into a display information RAM set on the RAM 2, thereby enabling WYSIWYG (What You See is What You Get) on the CRT display 10 to be realized. The CPU 1 opens various registered windows and executes various data processes on the basis of the command instructed by a mouse cursor or the like (not shown) on the CRT display 10.

The keyboard (KB) 9 has a number of keys for inputting various information. The CRT display 10 displays various information. The auxiliary storage 11 comprises the hard disk (HD), floppy disk (FD), or the like and stores a boot program, various applications, font data, a user file, an edition file, and the like.

A computer control unit 2000 is constructed by the CPU 1, RAM 2, ROM 3, system bus 4, keyboard controller 5, CRT controller 6, memory controller 7, and printer controller 8.

The printer 1000 comprises: a CPU (central processing unit) 12; a ROM (read only memory) 13; an auxiliary storage 14; a system bus 15; an engine interface 16; a printer engine 17; an input unit 18; a RAM (random access memory) 19; a memory controller (MC) 20; and an operation unit 22 (corresponding to the operation panel 1012 in FIG. 1). The printer control unit 1001 is constructed by the CPU 12, ROM 13, system bus 15, engine interface 16, input unit 18, RAM 19, and memory controller 20.

Figure 5:
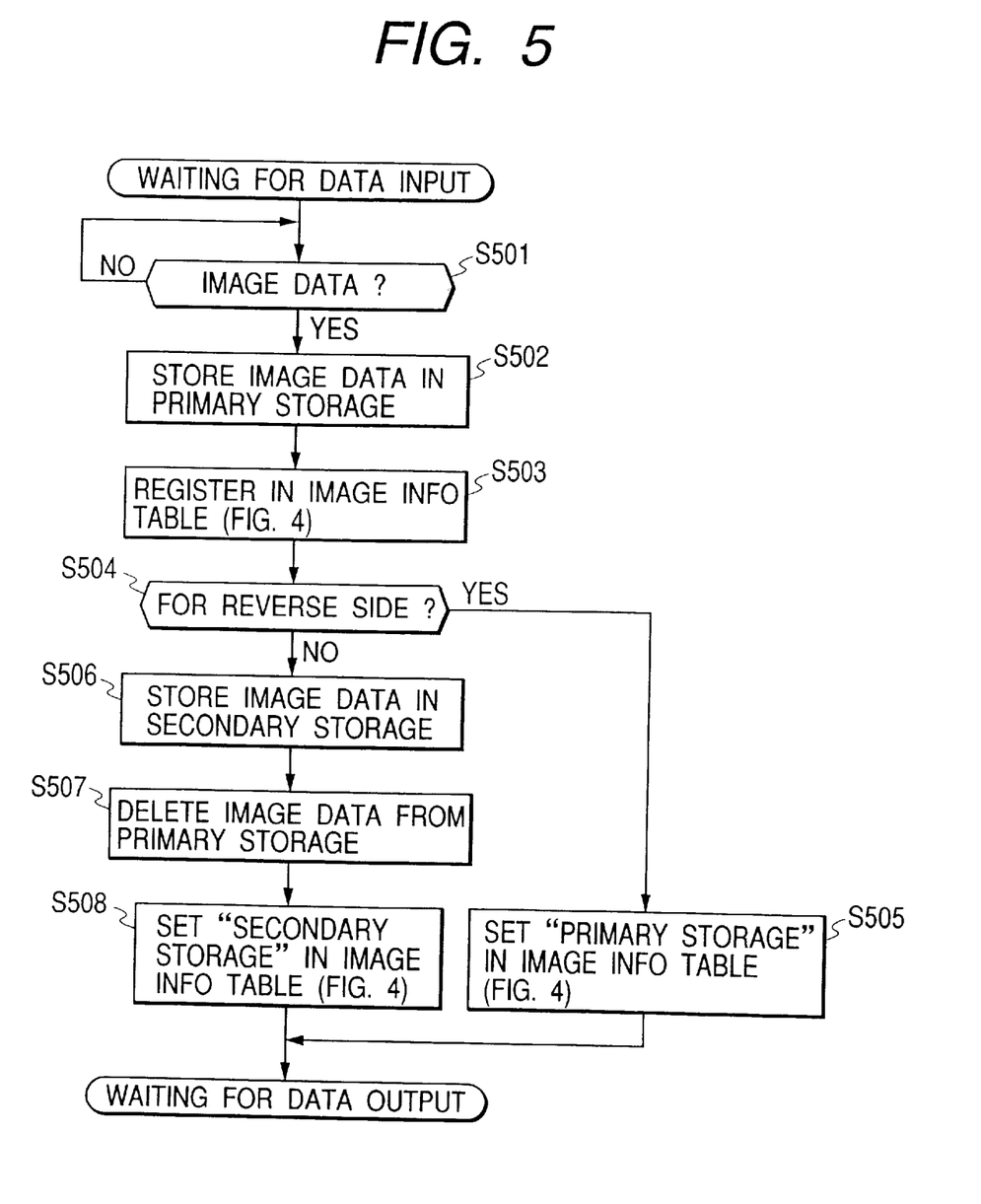
FIG. 5 is a flowchart showing a flow of the operation of the data input/output apparatus according to the first embodiment of the invention.
Figure 6:
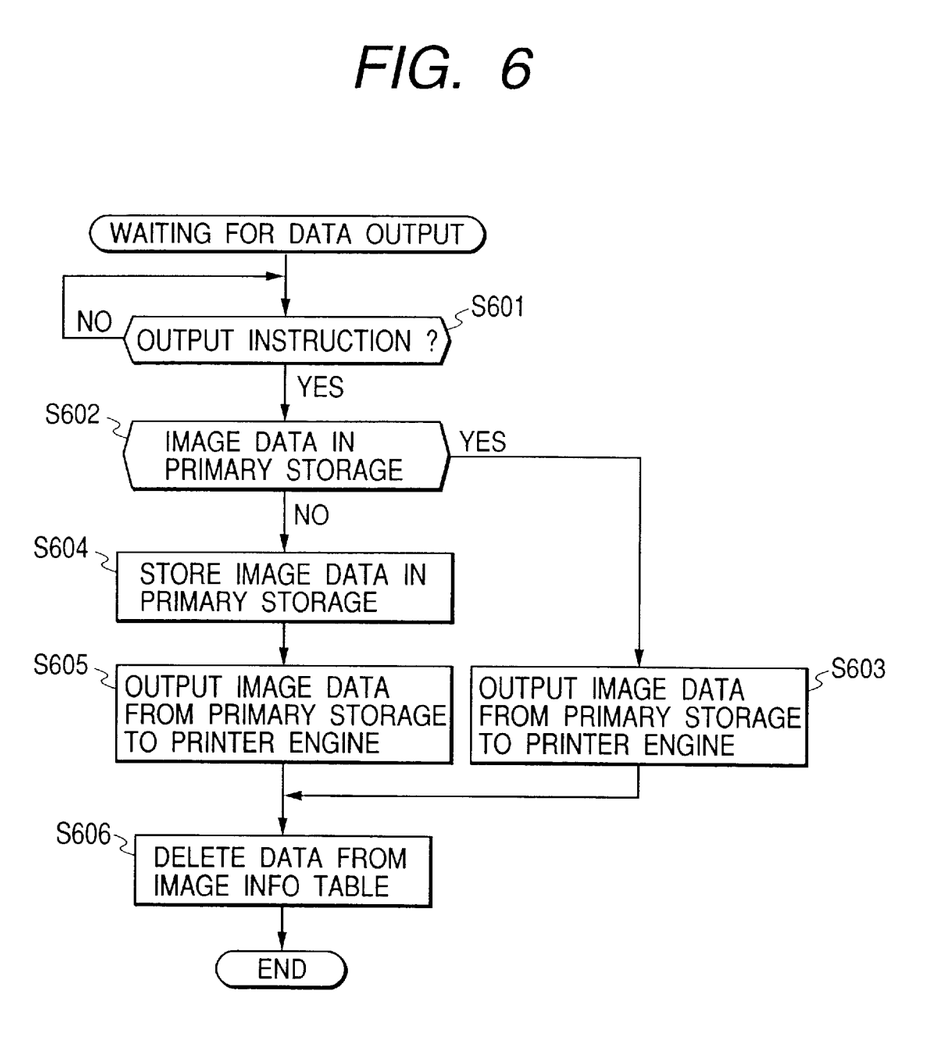
FIG. 6 is a flowchart showing a flow of the operation of the data input/output apparatus according to the first embodiment of the invention.

The CPU 12 controls the whole printer 1000 on the basis of a control program. The ROM 13 has a font ROM 13a, a program ROM 13b, and a data ROM 13c. Font data which is used when the output information is formed is stored in the font ROM 13a. The control program or the like of the CPU 12 as shown in flowcharts of FIGS. 5 and 6 is stored in the program ROM 13b. Information or the like which is used on the host computer 3000 is stored in the data ROM 13c in case of a printer which does not have the auxiliary storage 14 such as a hard disk (HD) or the like.

The auxiliary storage 14 is connected as an option, stores data such as font data, emulation program, form data, or the like, and is constructed by a hard disk (HD), an IC card, or the like. An access to the auxiliary storage 14 is controlled by the memory controller 20. The auxiliary storage 14 is not limited to one but can be constructed in such a manner that two or more storages are equipped and a plurality of option font cards in addition to built-in fonts and a plurality of auxiliary storages in which programs for interpreting printer control languages of different language systems have been stored can be connected. Further, the auxiliary storage 14 can have an NVRAM (not shown) and store printer mode setting information from the operation panel 1012.

The respective devices constructing the printer control unit 1001 are connected to the system bus 15. The engine interface 16 connects the printer engine 17 and printer control unit 1001. The printer engine 17 prints data to be printed onto a print paper. Switches for operation, an LED (light emitting diode) display, and the like are arranged on the operation unit 22. Data from the host computer 3000 is inputted via the interface 21. The CPU 12 can communicate with the host computer 3000 via the input unit 18 and notify the host computer 3000 of the information or the like in the printer 1000. The RAM 19 functions as a main memory or a work area of the CPU 12 and is constructed so that a memory capacity can be expanded by an option RAM connected to an expansion port (not shown). The RAM 19 is used as an output information rasterizing area, an environment data storing area, an NVRAM, or the like. The memory controller 20 controls an access to the auxiliary storage 14.

The CPU 12 integratedly controls accesses to the devices connected to the system bus 15 on the basis of the control program stored in the program ROM 13b of the ROM 13 and generates an image signal serving as output information to the printer engine 17 connected via the engine interface 16.

Figure 3:
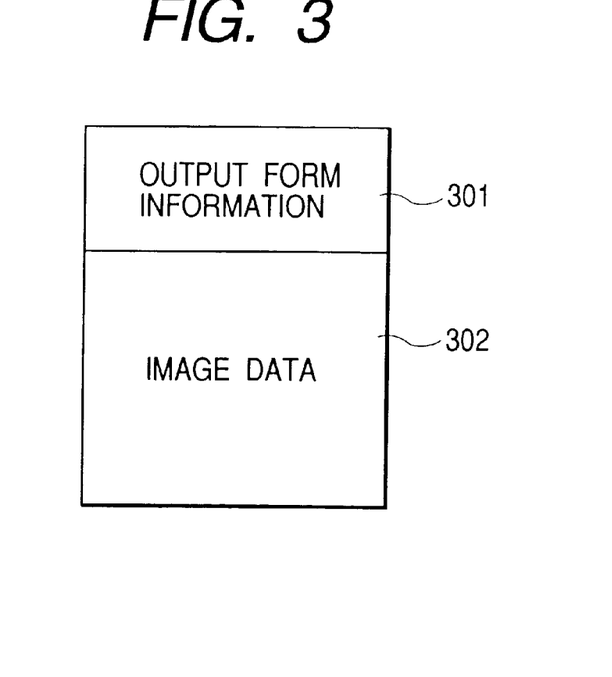
FIG. 3 is a diagram showing an image data format in the data input/output apparatus according to the first embodiment of the invention.

FIG. 3 is a diagram showing a format of the image data that is inputted to the printer 1000. As shown in the diagram, the image data has output form information 301 as information for discriminating whether the image data is data to be outputted to the reverse side of the previous output data (or data to be outputted as a pair together with the previous output data) or not. Reference numeral 302 denotes image data to be outputted and this data is in a state where the output form information 301 has been added.

Figure 4:
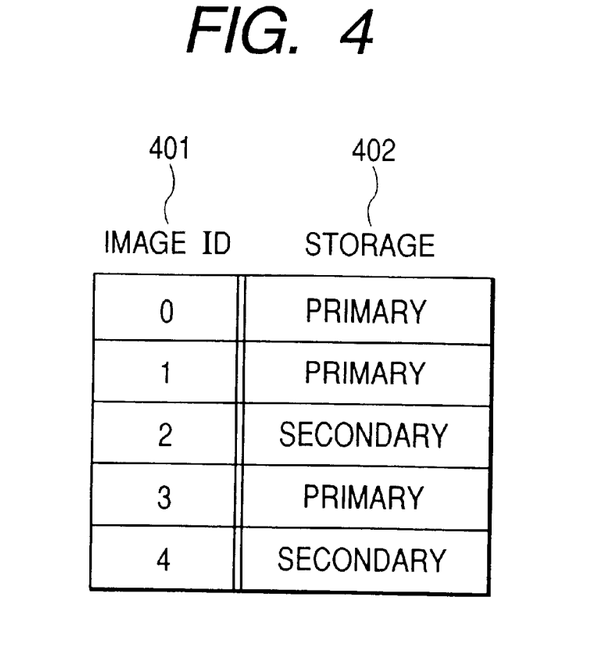
FIG. 4 is a diagram showing a format of data which is stored in the data input/output apparatus according to the first embodiment of the invention.

FIG. 4 shows an image information table which is stored in the printer 1000. This table has: image ID information 401 as information for specifying a storage in which image data which is not yet outputted in the image data inputted to the printer 1000 has been stored; and storage information 402.

In the embodiment, a primary storage denotes a built-in storing device such as a RAM 19 and a secondary storage denotes an auxiliary storage 14 which is connected as an option.

The operation of the printer 1000 according to the embodiment with the above construction will now be described with reference to flowcharts of FIGS. 5 and 6.

In the embodiment, a series of input/output processes is divided into the following two processes and will be explained.

That is, the processes from a state of waiting for input of the image data from the printer 1000 to a completion of an image data input process will be explained on the basis of FIG. 5. The processes from a state of waiting for an instruction to output the image data to a completion of an image data output process will be explained on the basis of FIG. 6.

First, the processes from the state of waiting for the image data input to the completion of the image data input process will be explained with reference to FIG. 5.

In step S501, whether the image data has been inputted or not is repetitively discriminated until it is inputted. When it is determined that the image data has been inputted, the input image data is stored into the primary storage in next step S502. In next step S503, the image data is registered into the image information table shown in FIG. 4 as un-output image data inputted to the printer 1000.

Subsequently, in step S504, a check is made to see if the image data inputted in step S501 is the data to be outputted to the reverse side of the previous output image data (or data to be outputted as a pair together with the previous output image data). When it is determined that the inputted image data is the data to be outputted to the reverse side of the previous output image data (or data to be outputted as a pair together with the previous output image data), an identifier indicative of the primary storage is set to the image storing location in the image information table shown in FIG. 4 in step S505. After that, the apparatus enters a state of waiting for the instruction to output the image data in FIG. 6.

When it is determined in step S504 that the inputted image data is not the data to be outputted to the reverse side of the previous output image data (or data to be outputted as a pair together with the previous output image data), the image data stored in the primary storage is stored into the secondary storage in step S506. Subsequently, the image data stored in the primary storage is deleted in step S507. In step S508, an identifier indicative of the secondary storage is set to the image storing location in the image information table shown in FIG. 4. After that, the apparatus enters a state of waiting for the instruction to output the image data in FIG. 6.

The processes from the state of waiting for the image data output instruction to the completion of the image data output process will now be described with reference to FIG. 6.

Whether the image data output has been instructed or not is repetitively discriminated in step S601 until it is instructed. When it is determined that the image data output has been instructed, whether the image data (image data to be outputted) instructed in step S601 has been stored in the primary storage or not is discriminated in step S602 by checking the image information table shown in FIG. 4. When it is determined that the image data to be outputted has been stored in the primary storage, by transferring the image data from the primary storage to the printer engine 17 in step S603, the image data output process is completed. The processing routine advances to step S606.

When it is decided in step S602 that the image data to be outputted has been stored in the secondary storage, the image data stored in the secondary storage is stored into the primary storage in step S604. Subsequently, by transferring the image data from the primary storage to the printer engine 17 in step S605, the image data output process is completed. The image data registered in the image information table shown in FIG. 4 is deleted in step S606. After that, the processing routine is finished.

According to the data input/output apparatus of the embodiment, the computer reads out and executes the control program stored on the storage medium, thereby realizing the functions of the embodiment. However, the invention is not limited to this example but incorporates a case where the OS (operating system) or the like which is operating on a computer executes a part or all of the actual processes on the basis of instructions of the control program and the functions of the embodiment are realized by those processes.

As a storage medium for storing the control program, for example, it is possible to use a floppy disk, a hard disk, an optical disk, a magneto-optic disk, a CD-ROM (Compact Disc Read Only Memory), a CD-R (Compact Disc Recordable), a magnetic tape, a non-volatile memory card, an ROM chip, or the like.

Second Embodiment

In the foregoing first embodiment, the storing location of the image data has been decided on the basis of the information (added to the image data) such as an output side or the like of the image data in step S504 in FIG. 5. However, in place of the information such as an output side or the like of the image data added to the image data, it is also possible to add output priority information of the image data to the image data and control the storing location of the image in accordance with the priority.

Third Embodiment

In the foregoing first embodiment, in step S504 in FIG. 5, the storing location of the image data has been decided on the basis of the information (added to the image data) such as an output side or the like of the image data. However, the storing location of the image data can be also controlled by the memory capacity of the storage equipped for the printer 1000.

According to the data input/output method and apparatus of the embodiments of the invention as described in detail above, the unnecessary data transfer in the double-sided output mode of the output medium can be avoided, so that there is such an effect that the time which is required from the input to the output can be reduced.

According to the storage medium of the embodiments of the invention, there is such an effect that the data input/output apparatus of the invention as mentioned above can be smoothly controlled.

The present invention is not limited to the foregoing embodiments but many modifications and variations are possible within the spirit and scope of the appended claims of the invention.

What is claimed is:

1. A data input/output method of inputting/outputting data using a data input/output apparatus having a first storage unit which can input data directly from a data input unit and can output data directly to a data output unit and a second storage unit which stores data stored in the first storage unit, comprising:

a first data storing step of storing data inputted from the data input unit in the first storage unit;

a second data storing step of storing the data stored in said first data storing step in the second storage unit;

a data discriminating step of discriminating whether the data inputted into the first storage unit is to be recorded on a reverse side of a recording medium including data which was previously outputted from the first storage unit to the data output unit; and a control step of controlling the data inputted into the first storage unit not to be stored in the second storage unit if it is determined in said data discriminating step that the data is to be recorded on the reverse side of the recording medium including the previously outputted data.

2. A method according to claim 1, further comprising:

a priority discriminating step of discriminating an output priority of data inputted from the data unit; and a second control step of, when it is determined in said priority discriminating step that the output priority of the data inputted from the data input unit is higher than that of any other data, controlling the data inputted into the first storage unit from the data input unit to be outputted directly to the data output unit without being stored in the second storage unit.

3. A method according to claim 1, further comprising an information registering step of assigning an identifier to each set of data inputted from the data input unit, and registering, for each set of data which has not been outputted, information specifying either of the first and second storage units in which the data is stored.

4. A method according to claim 3, further comprising:

a first determining step of determining whether an output instruction is provided for the data stored in the first or second storage unit; and a second determining step of determining one of the first and second storage units in which the data for the output instruction is stored based on the information registered in said information registering step if it is determined in said first determining step that the output instruction is provided.

5. A data input/output apparatus comprising:

a first storage unit which can input data directly from a data input unit and can output data directly to a data output unit;

a second storage unit for storing data stored in said first storage unit;

a data discriminating unit for discriminating whether data inputted into said first storage unit is to be recorded on a reverse side of a recording medium including data which was previously outputted from said first storage unit to the data output unit; and a control unit for controlling the data inputted into said first storage unit not to be stored in said second storage unit if said data discriminating unit discriminates that the data is to be recorded on the reverse side of the recording medium including the previously outputted data.

6. An apparatus according to claim 5, further comprising:

a priority discriminating unit adapted for discriminating an output priority of data inputted from the data input unit; and a second control unit for, when said priority discriminating unit discriminates that the output priority of the data inputted from the data input unit is higher than that of any other data, controlling the data inputted into said first storage unit from the data input unit to be outputted directly to the data output unit without being stored in said second storage unit.

7. An apparatus according to claim 5, further comprising an information registering unit adapted for assigning an identifier to each set of data inputted from the data input unit, and registering, for each set of data which has not been outputted, information specifying either of the first and second storage units in which the data is stored.

8. An apparatus according to claim 7, further comprising:

a first determining unit adapted for determining whether an output instruction is provided for the data stored in said first or second storage unit; and a second determining unit adapted for determining one of said first and second storage units in which the data for the output instruction is stored based on the information registered by said information registering unit if said first determining unit determines that the output instruction is provided.

* * * * *